United States Patent [19]
Bergeron

[11] Patent Number: 5,215,127
[45] Date of Patent: Jun. 1, 1993

[54] SANDBAG FILLING DEVICE

[76] Inventor: Guy E. Bergeron, Box 500 Ste. Eustache, Manitoba, Canada, R0H 1H0

[21] Appl. No.: 791,201

[22] Filed: Nov. 13, 1991

[51] Int. Cl.$^5$ .................. B65B 1/04; B65B 3/06
[52] U.S. Cl. .................. 141/10; 141/114; 141/231; 141/313; 141/131
[58] Field of Search .......... 141/10, 114, 231, 313, 141/314, 315, 316, 317, 236, 248, 247, 131, 134, 234; 366/30, 150, 177, 179, 181, 183; 193/14, 29

[56] References Cited

U.S. PATENT DOCUMENTS

| | | | |
|---|---|---|---|
| 2,586,557 | 2/1952 | Newbold | 141/317 X |
| 2,799,301 | 7/1957 | Ballard | 141/248 X |
| 3,199,550 | 8/1965 | Crowe | 141/315 X |
| 3,255,857 | 6/1966 | Armstrong et al. | 193/29 X |

Primary Examiner—Henry J. Recla
Assistant Examiner—Steven O. Douglas
Attorney, Agent, or Firm—Adrian D. Battison; Stanley G. Ade; Murray E. Thrift

[57] ABSTRACT

A sand bag filling device comprises a trailer having a vertical post with a distribution head at a top of the vertical post. This distribution head is attached to a plurality of filling spouts which extend downwardly and outwardly from the head to positions surrounding the head. A rotatable chute is positioned at the top of the head for receiving sand from a conveyor and for supplying that sand to each in turn of the filling spouts. Emergency personnel can move a sand bag to each spout in turn with the amount of material being controlled so that the bag is filled before the distribution head moves the supply to the next adjacent filling spout.

12 Claims, 3 Drawing Sheets

1

SANDBAG FILLING DEVICE

BACKGROUND OF THE INVENTION

This invention relates to an apparatus for use in filling sand bags.

Sand bags are often used in military situations or in flooding situations to provide a structurally stable embankment formed from readily available materials.

In most cases of use of sand bags the locating of the sand bags is generally of a temporary nature but requires to be implemented relatively quickly. Thus in the military situation the embankment formed from the sandbags is provided for protection of personnel and equipment and must therefore be quickly deployed so that the personnel and equipment are not left exposed. In the flooding or water control situation, again it is often desirable to deploy the sandbags very quickly since flooding can arise and subside within a few hours.

Up until now the technique generally used in the field for filling of sandbags is a very crude system based upon manual labor using simply shovels and the manual support of the bag so that one person shovels while a second person holds the mouth of the bag open. This is of course very slow and tedious process and thus involves the second person holding the bag open for an extended period of time which is of course tiring.

Machines have been proposed for use in filling sandbags but these have achieved little success in practice and therefore have not been widely adopted.

The old U.S. Pat. No. 121529 (Lum) from 1871 simply discloses a funnel system and stand which assist in supporting a bag for filling but do not significantly increase the speed of filling or the efficiency of the operation so that sand bags can be filled and located much more quickly.

The very similar U.S. Pat. Nos. 3552346 (Garden) and 4044921 (Caverly) disclose sand bag filling systems in which sand is supplied on a hopper of a truck and is discharged from the rear of the truck into a single bag which is positioned at the required location for receiving the sand. In both cases the rate of filling bags is very slow since only a single bag at a time can be filled and then must be moved away from the filling location before a second bag can be filled. This provides a very slow operation which is unlikely to provide bags at a sufficient rate for an emergency situation even when large numbers of persons are available for manual labor.

The patent of Garden requires manual operation of a filling valve and this is of course disadvantageous in that the operator must remove one hand from the bag to operate the valve with the danger of spilling.

The patent of Caverly discloses an arrangement which is relatively complex including a conveyor and filling control system. The device is therefore relatively expensive and is dedicated solely to the purpose of filling bags. It cannot operate at the very high rate required for emergency use and hence is of little value in such a situation.

U.S. Pat. No. 2,463,085 (Byberg) discloses a bagging system for harvested crops in which the crops are discharged into a hopper and each bag in turn moved by a carrying chain system from a bag attachment station, through a filling station to a discharge position. The unit is mounted upon a trailer system so that the unit can be carried across the ground for bagging harvested crops such as onions, potatoes and the like. The system again is relatively slow and does not make efficient use of the large number of persons available in an emergency situation, nor does it fill bags at a rate which would enable the large number of persons available to be efficiently occupied in filling and locating the bags.

U.S. Pat. No. 2548222 (Kindseth) discloses a system for filling bags with a powder material such as flour in which bags are moved past filling stations. This system is of little relevance for the rapid filling of sand bags.

SUMMARY OF THE INVENTION

It is one object of the present invention, therefore, to provide a sand bag filling apparatus which can be rapidly deployed at a location where sand bags are required and provides rapid filling of bags.

According to a first aspect of the invention, there is provided an apparatus for filling sand bags comprising a support structure, a distribution head mounted on the support structure, a plurality of discharge spouts each mounted on the support structure and each defining a separate duct extending from the distribution head to a discharge mouth of the discharge spout, the distribution head being mounted at an elevated position from the ground for receiving sand for filling into bags from a conveyor, each spout being arranged to cause flow of sand therethrough by gravity from the distribution head to the discharge mouth, each discharge mouth being spaced from the ground by a distance to receive a sandbag thereunder, and distribution means at the distribution head movable to cause a predetermined quantity of the sand supplied to the distribution head to be supplied to each in turn of the spouts and then to close off further supply to said each in turn of the spouts.

According to a second aspect of the invention, there is provided a method of filling sand bags comprising providing a plurality of separate filling spouts, supplying sand from a conveyor to a distribution head, moving a distribution member at the distribution head to cause the sand to flow from the conveyor into each in turn of the filling spouts and then to close off further supply of sand to said each in turn of the filling spouts, causing the sand to flow through the filling spout to a discharge mouth of the filling spout by gravity, manually moving bags to be filled such that the discharge mouth of each spout has a bag held thereat at the time that the spout is supplied with sand, locating the height of the discharge mouth from a support surface for the bag such that the bag is on or adjacent the support surface as it is filled, moving the filled bag from the mouth and replacing the filled bag with an empty bag during the time that the sand is closed off from that filling spout.

According to a third aspect of the invention there is provided an apparatus for filling sand bags comprising a support structure mounted upon a vehicle having ground wheels for transportation of the support structure from site to site, the support structure comprising a tower extending vertically upwardly from the vehicle, a distribution head mounted at the top of the tower, a plurality of discharge spouts each mounted on the support structure and each defining a separate duct extending from an open end at the distribution head downwardly and outwardly to a discharge mouth of the discharge spout, the distribution head being mounted on the tower at an elevated position from the ground for receiving sand discharged downwardly from a conveyor for filling into bags, each spout being arranged to cause flow of sand therethrough by gravity from the distribution head to the discharge mouth, each discharge mouth being spaced from the ground by a distance to receive a sandbag thereunder, and distribution means at the distribution head movable to cause a predetermined quantity of the sand supplied to the distribution head to be supplied to each in turn of the spouts and then to close off further supply to said each in turn of the spouts the open ends of the discharge spouts being arranged at a base plate of the distribution head as a circle and the distribution means being rotatable about a vertical axis passing through the center of the circle.

One or more embodiments of the invention will now be described in conjunction with the accompanying drawings.

BRIEF DESCRIPTION OF THE DRAWINGS

In the drawings like characters of reference indicate corresponding parts in the different figures.

DETAILED DESCRIPTION

The apparatus according to the present invention comprises a distribution apparatus generally indicated at 10 for distributing sand carried upon a feed conveyor 11 to a plurality of sand bags one of which is indicated at 12.

Figure 1:
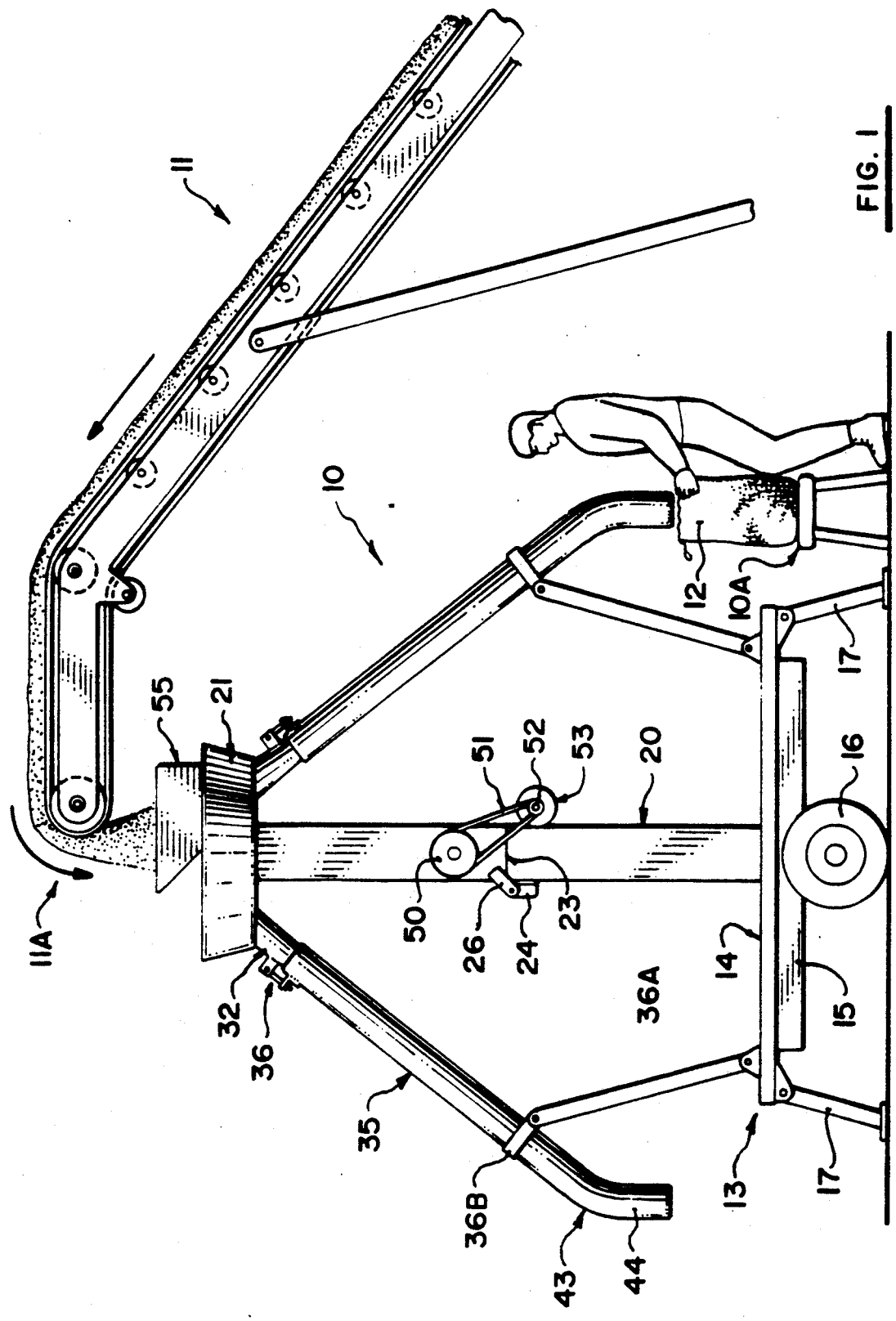
FIG. 1 is a side elevational view of an apparatus according to the present invention with a number of the filling spouts omitted for convenience of illustration.

The apparatus 10 comprises a trailer 13 having a horizontal upper platform 14, a frame 15 mounted on ground wheels 16 by which the trailer can be moved from place to place for assembly and use of the apparatus. As shown in FIG. 1 the trailer is in fixed position in which depending legs 17 are positioned at respective corners so as to locate the platform 14 in a fixed position. The legs are shown schematically but are of a type which can be raised for transportation and lowered for stability in fixed position.

Figure 2:
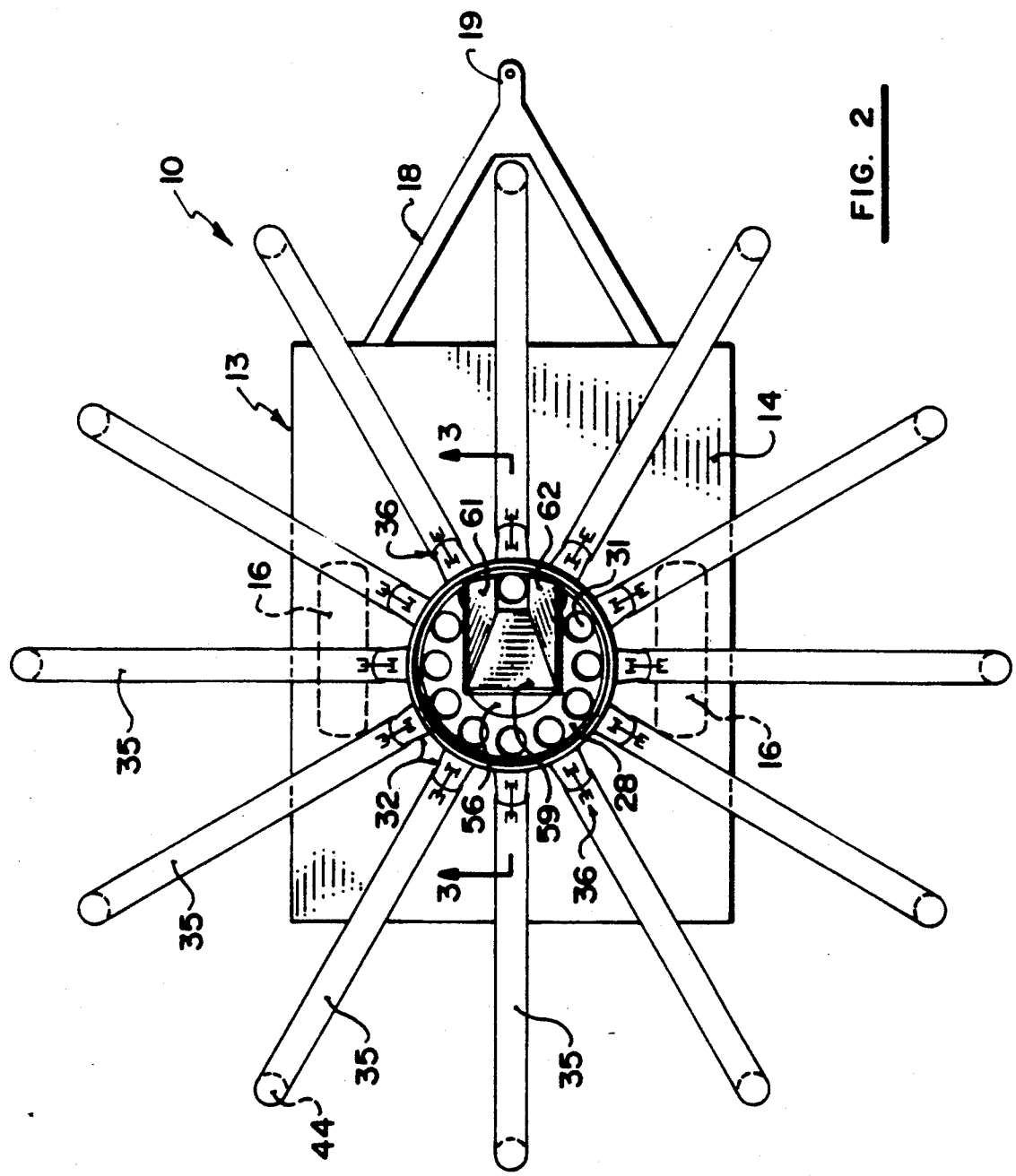
FIG. 2 is a top plan view of the apparatus of FIG. 1 with the feed conveyor omitted and with the hitch attached for transportation of the apparatus.

In FIG. 2 a hitch 18 is shown with a hitch member 19 for attachment to a suitable towing vehicle. The hitch 18 can be fastened in suitable manner to the frame 15 for towing of the trailer when required.

On top of the trailer is mounted a vertical post 20 which extends from the trailer to a distribution head 21 at a height of approximately 10 to 12 feet above the ground. The post 20 is formed from a square tubular member fastened at its lower end to the platform 14 and fastened at its upper end to a horizontal top plate 22 of the distribution head 21. The post is formed in two portions separated at an abutment line 23 allowing an upper part of the post to be pivoted away from the abutment line through 180° to lie alongside the lower part of the post. For this purpose the lower part of the post includes an outstanding flange 24 which carries a pivot pin 25 on which is mounted a pair of ears 26 carried by the upper part of the post to allow pivotal movement of the upper part about the pin 25.

Figure 3:
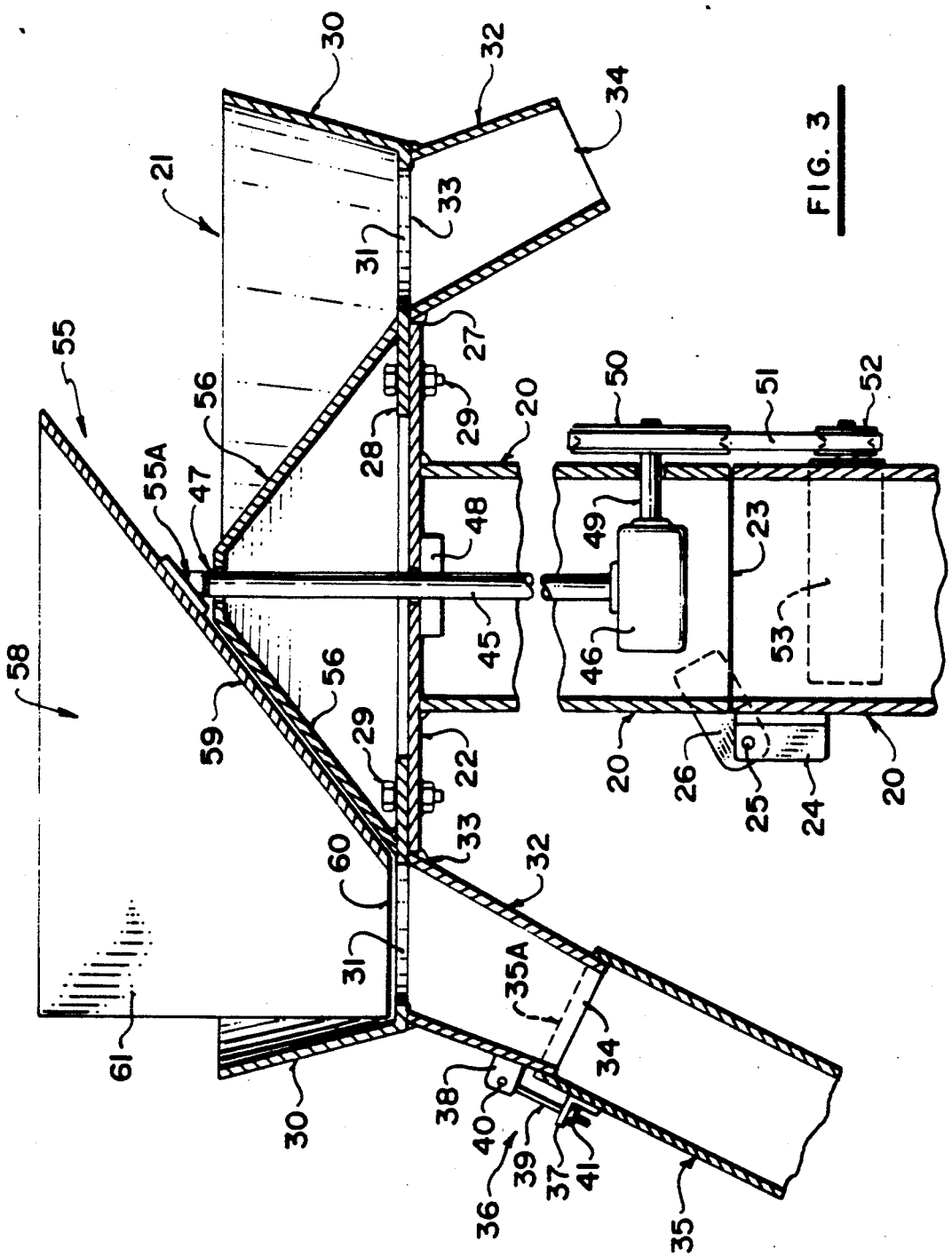
FIG. 3 is a cross-sectional view along the lines 3—3 on an enlarged scale showing the details on the distribution head.

Turning now to FIG. 3, the top plate 22 of the distribution head 21 is circular and extends outwardly from the post 20 to a peripheral edge 27. An annular plate 28 extends from the peripheral edge 27 outwardly and lies substantially in the horizontal plane of the plate 22. The annular plate 28 includes an overlapping portion resting on top of the plate 22 and attached thereto by bolts 29 passing through the two plates and accessible on the underside of the plate 22.

The annular plate carries at its outer periphery an upstanding rim 30 which surrounds the plate 28 and forms therewith a receptacle for the sand to be distributed. The rim 30 is tapered slightly outwardly so as to converge any sand falling on the rim inwardly toward the plate 28.

The plate 28 includes a plurality of circular holes 31 arranged at angularly spaced positions around the periphery of the plate 28. The holes have centres lying on a common circle surrounding a centre of the plate 28. The holes are dimensioned so that side edges of the holes are substantially in contact or spaced by a narrow band of material of the plate 28 between each hole and the next adjacent hole.

On the underside of the plate 28 is welded a plurality of funnels 32 each having a mouth 33 directly surrounding an underside of a respective one of the holes 31. Each of the funnels 32 has a longitudinal axis inclined outwardly and downwardly from the underside of the plate 28. Each of the funnels tapers gradually from the mouth 33 to a discharge opening 34 at a lower end of the funnel.

In one practical example there may be 12 such holes 31 having a diameter of the order of eight to ten inches and positioned on a circle of the order of two and a half feet surrounding the centre of the post.

Each of the funnels 32 is attached to a filling spout 35 which has an upper end 36 just surrounding the mouth 34 of the spout 32. The filling spout 35 is supported upon the spout 32 by a bracket 36 including a right angle bracket portion 37 attached to an upwardly facing part of the wall of the spout 35 together with a pair of flanges 38 mounted on the spout 32 at a position aligned with the angle bracket. A pin 39 is attached to the flanges 38 by a transverse pin 40 allowing the pin 39 to pivot upwardly and downwardly. The angle bracket 37 is forked in the flange portion thereof extending outwardly from the wall of the spout 35 so that the pin 39 can be pushed into a slot in the flange and held in place by a nut 41 threaded onto a threaded part of the pin 39.

The spout 35 is thus mounted upon the spout portion 32 and is held in place by the engagement between the mouth 35A and the discharge opening 34 and by the bracket 36. A support strut 36A extends from the platform 14 of the trailer to a clamp 36B on the spout 35 at a position closer to the discharge end to assist in providing effective support. The filling spout 35 can thus be readily removed by disconnecting bracket 36 and strut 36A so that the whole apparatus can be rapidly disassembled as required for transportation.

The filling spouts 35 have a longitudinal axis following substantially the outwardly and downwardly axis of the sport portion 32. Thus as best shown in FIG. 2, the filling spouts 35 extend radially outwardly from the centre of the post and are inclined downwardly to a circle at a lower end of the filling spouts surrounding the platform 14 of the trailer. With the hitch 18 removed as shown in FIG. 1, the lower end of each of the filling spouts is readily accessible by a person approaching the apparatus from outside the trailer 13 so that a person can walk readily to a selected one of the lower ends of the discharge spouts for access thereto for filling of a sandbag 12.

At the lower end of each of the discharge spouts, there is provided a shallow bend portion 43 defining a vertical section 44 through which the sand is discharged vertically downwardly after sliding longitudinally of the filling spout 35. The angle of the filling spout is arranged such that the material can by gravity from the discharge spout 32 downwardly to the vertical portion 44 for discharge into the sandbag. There are no valves nor other closures within the discharge spout 35 from its upper end 35 communicating with the respective hole 31 to the lower discharge end 44.

Within the post 20 is mounted a drive shaft 45 which extends vertically along the post from a lower drive gear box 46 to an upper end 47 above the plate 22 and passing through a bearing 48 attached to the plate 22. The gear box 46 is driven by a shaft 49 passing through a hole in the wall of the post to a pulley 50 cooperating with a Y belt 51 driven by a smaller pulley 52 attached to a motor 53. The motor is mounted on one side of the lower part of the post. The pulley 50 and the gear box 46 are mounted on the upper part of the post so that the shaft is carried wholly by the upper part and does not affect the pivotal action of the upper part relative to the lower part.

The upper end 47 of the drive shaft 45 is attached to a rotating distribution member 55 by a pin 55A attached to the member 55 and extending downwardly therefrom into releasable engagement with a splined opening in the top of the drive shaft 47. The distribution member rides on a fixed conical plate 56 which covers the upper surface of the plate 22 and the inner part of the plate 28 and is welded thereto to terminate adjacent the inside edge of the holes 31. The distribution member 55 comprises a chute portion 58 defined by an inclined rear wall 59 and two side walls 61 and 62. The chute defines an upper open rectangular mouth into which material can be discharged. The chute tapers inwardly and downwardly as best shown in FIG. 2 to a square open base 60 through which the material can be discharged. The base 60 is dimensioned to be approximately equal to or slightly greater than the diameter of one of the holes 31.

In operation a conventional conveyor 11 is operated to transport sand upwardly from a supply at the lower end in a metered amount to an upper discharge section 11A from which the material can be discharged downwardly onto the distribution apparatus. The details of the conveyor 11 are shown only schematically as these will be well known to one skilled in the art as this type of machine is readily available on a commercial basis. The rate of supply of the material is metered by a suitable gate system and by the speed of movement of the belt section of the conveyor so that the material is discharged from the upper section 11A at a predetermined weight per unit time.

The distribution member 55 is rotated by the shaft 45 relative to the receptacle 21 so that the sand material discharged from the upper part 11A of the conveyor falls into the chute and is guided to a respective one of the holes 31 for transportation through the associated filling spout to an opening at the lower end of that filling spout. The apparatus is serviced by a number of emergency personnel who carry an empty sand bag to each in turn of the filling spouts and time their positioning of an empty bag so that as the material is discharged into the respective filling spout, an empty bag is positioned underneath that spout ready to be filled. It will be appreciated that as the distribution member rotates it moves the filling position from each of the filling spouts to the next in turn of the filling spouts angularly spaced around the axis of the post. The rate of rotation is selected relative to the predetermined rate of delivery so that enough sand is supplied to the filling spout to fill the sand bag before the distribution member moves to the next of the filling spouts. Each bag is thus filled at the respective filling spout giving time for the person assigned to that spout to tie off the bag when filled and remove the bag to a use location and to return to that spout with an empty bag before the filling spout is again supplied with the sand by the distribution member.

Each person moving to a filling spout therefore simply has the responsibility to receive the sand and to remove the bag when filled. There is no valve assembly to operate to close off the supply of sand so that both hands of the user are available for grasping and handling the sand bag. The height of the vertical portion 44 is arranged so that it is just sufficient to receive an empty bag thereunder while the bag rests upon a suitable support surface 10A which may be the ground, a fixed board or a narrow conveyor. The apparatus thus can be used to fill bags very rapidly using the large number of emergency personnel available during an emergency situation such as a military action or threatened flooding. The apparatus is very simply and can be dismantled and moved from place to place so that it is readily available for immediate use in the location where the sand bags are to be located.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for filling sand bags comprising a support structure, a distribution head mounted on the support structure, a plurality of discharge spouts each mounted on the support structure and each defining a separate duct extending from the distribution head to a discharge mouth of the discharge spout, the distribution head being mounted at an elevated position from the ground for receiving sand for filling into bags from a conveyor, each spout being arranged to cause flow of sand therethrough by gravity from the distribution head to the discharge mouth, each discharge mouth being spaced form the ground by a distance to receive a sandbag thereunder, and distribution means at the distribution head movable to cause a predetermined quantity of the sand supplied to the distribution head to be supplied to each in turn of the spouts and then to close off further supply to said each in turn of the spouts, the distribution head having the discharge spouts attached thereto such that an open upper end of each discharge spout is presented at the distribution head for receiving the sand therein, the open upper mouths of the discharge spouts being arranged in a circle such that rotation of the distribution means about a vertical axis centrally of the discharge spouts causes said feeding of the said sand to each in turn of the discharge spouts, the distribution head comprising an annular base surface lying in a substantially horizontal plane with thereon mouths of the discharge spouts connected thereto and lying in said horizontal plane so as to be presented upwardly therefrom and an upstanding peripheral wall surrounding the annular base surface, the distribution means comprising a chute having an open upper mouth, a plurality of guide surface means upstanding from the annular base surface and converging form the open upper mouth downwardly and tapering inwardly to a bottom control opening at the annular base surface which is smaller than the open upper mouth, the control opening being arranged to overlie said annular base surface so as to deposit the sand thereon, he chute being rotatable about the axis so as to move the control opening around the annular base surface from each open mouth of a discharge spout to a next adjacent open mouth of a discharge spout.

2. The apparatus according to claim 1 wherein each of he discharge spouts is continually open form the distribution head to the discharge mouth so that he flow of sand therethrough is controlled only by the distribution head.

3. The apparatus according to claim 1 wherein support structure is mounted upon a vehicle having ground wheels for transportation of the support structure from site to site.

4. The apparatus according to claim 1 wherein the support structure comprises a central mast around which the discharge spouts are arranged.

5. The apparatus according to claim 4 including a drive motor and a drive shaft extending vertically upwardly along the central mast from the drive motor to the distribution means at the distribution head at the top of the mast.

6. The apparatus according to claim 4 wherein the distribution head includes a portion of each discharge spout attached thereto and extending downwardly therefrom, a remaining portion of each discharge spout being readily removable from and attachable to the first portion.

7. The apparatus according to claim 6 wherein the mast includes an upper portion and a lower portion and hinge means therebetween allowing the upper portion of the mast to be folded downwardly relative to the lower portion.

8. A method of filling sand bags comprising providing a plurality of separate fixed filling spouts, substantially continuously supplying sand from a conveyor to a distribution head, substantially continuously moving a distribution member at the distribution head such that as the head continues to rotate it causes the distribution member to sweep past each filling spout in turn so as to cause the sand to flow form the conveyor into each int urn of the filling spouts and then to close off further supply of sand to said each in turn of the filling spouts, arranging the filling spouts such that he sand is prevented form escaping between the filling spouts as the distribution member sweeps past one filling spout to the next, causing the sand to flow through the filling spout to a discharge mouth of the filling spout by gravity, manually moving bags to be filled such that the discharge mouth of each spout has a bag held manually thereat at the time that the spout is supplied with sand, locating the height of the discharge mouth form a support surface of the bag such that the bag is on or adjacent the support surface as it is filled, moving the filled bag form the mouth and replacing the filled bag with an empty bag during the time that the sand is closed off form that filling spout.

9. Apparatus for filling said bags comprising a vehicle having ground wheels for transportation from site to site, a support structure mounted on the vehicle for movement therewith, the support structure comprising a tower extending vertically upwardly form the vehicle, a distribution head mounted at the top of the tower, a plurality of discharge spouts each mounted on the support structure and each defining a separate duct extending from an open end at the distribution head downwardly and outwardly to a discharge mouth of the discharge spout, the distribution head being mounted don the tower at an elevated position from the ground for receiving sand discharged downwardly form a conveyor for filing into bags, each spout being arranged to cause flow of sand therethrough by gravity form the distribution head to the discharge mouth, each discharge mouth being spaced form the ground by a distance to receive a sandbag thereunder, and distribution means at the distribution head movable to cause a predetermined quantity of the sand supplied to the distribution head to be supplied to each in turn of the spouts and then to close off further supply to said each in turn of the spouts the open ends of the discharge spouts being arranged in a base plate lying in a substantially horizontal plane of the distribution head as a circle and the distribution means being rotatable about a vertical axis passing through the center of the circle, each discharge spout having arranged in a vertical plane radial to said circle a first portion extending outwardly and downwardly form the open end in the distribution head and a second portion extending vertically downwardly for the first portion to the discharge mouth, said second portion of each discharge spout being arranged such that the discharge mouth thereof is spaced outwardly from the vehicle to be located vertically above the ground to one side of the vehicle.

10. The apparatus according to claim 9 wherein each of the discharge spouts is continually open from the distribution head to the discharge mouth so that the flow of sand therethrough is controlled only by the distribution head.

11. The apparatus according to claim 9 wherein the distribution means comprises a chute having guide surface means upstanding from the base plate and converging from an upper opening into which the sand is fed from a conveyor to a bottom control opening at the base plate, the control opening being arranged to overlie an open mouth of one of the discharge spouts, the guide surface means being commonly rotatable about the axis so as to move the control opening from each open mouth of a discharge spout to a next adjacent open mouth of a discharge spout.

12. The apparatus according to claim 9 wherein the tower comprises a single tubular mast and wherein there is provided a drive motor and a drive shaft extending vertically upwardly along the mast from the drive motor to the distribution means at the distribution head at the top of the mast.

* * * * *